(12) United States Patent
Sundrani

(10) Patent No.: US 8,769,199 B2
(45) Date of Patent: Jul. 1, 2014

(54) METHODS AND SYSTEMS OF DISTRIBUTING RAID IO LOAD ACROSS MULTIPLE PROCESSORS

(75) Inventor: Kapil Sundrani, Bareilly (IN)

(73) Assignee: LSI Corporation, San Jose, CA (US)

( * ) Notice: Subject to any disclaimer, the term of this patent is extended or adjusted under 35 U.S.C. 154(b) by 380 days.

(21) Appl. No.: 13/109,645

(22) Filed: May 17, 2011

(65) Prior Publication Data

US 2012/0297133 A1    Nov. 22, 2012

(51) Int. Cl.
*G06F 12/00*    (2006.01)
(52) U.S. Cl.
USPC ............................ 711/114; 711/142; 711/143
(58) Field of Classification Search
CPC ......... G06F 12/00; G06F 3/0689; G06F 3/06; G06F 2212/262; G06F 9/3857; G06F 2009/4557; G06F 2206/1012; G06F 9/5083
USPC .................................. 711/103, 118
See application file for complete search history.

(56) References Cited

U.S. PATENT DOCUMENTS 8,271,979 B2 *    9/2012    Sugimoto et al. ............. 718/100

* cited by examiner

*Primary Examiner* — Aimee Li
*Assistant Examiner* — Christopher Do
(74) *Attorney, Agent, or Firm* — Suiter Swantz pc llo

(57) ABSTRACT

A method for distributing IO load in a RAID storage system is disclosed. The RAID storage system may include a plurality of RAID volumes and a plurality of processors. The IO load distribution method may include determining whether the RAID storage system is operating in a write-through mode or a write-back mode; distributing the IO load to a particular processor selected among the plurality of processors when the RAID storage system is operating in the write-through mode, the particular processor being selected based on a number of available resources associated with the particular processor; and distributing the IO load among the plurality of processors when the RAID storage system is operating in the write-back mode, the distribution being determined based on: an index of a data stripe, and a number of processors in the plurality of processors.

14 Claims, 5 Drawing Sheets

METHODS AND SYSTEMS OF DISTRIBUTING RAID IO LOAD ACROSS MULTIPLE PROCESSORS

TECHNICAL FIELD

The present invention relates to the field of storage devices and particularly to a system and method for distributing RAID IO load across multiple processors.

BACKGROUND

Data storage systems may refer to computer components and recording media that retain digital data used for computing for some interval of time. Storage systems such as Redundant Array of Independent Disks (RAID) systems may be responsible for managing and processing input/output (IO) requests from one or more host devices that are attached to the storage system. One of the requirements for storage systems is to maintain data integrity while providing reasonable IO process times.

Larger caches and parallelism have been introduced to RAID controllers in order to improve their performance. In addition, certain RAID systems are being designed with multiple CPUs/processors so that the systems may offload certain processing tasks across such processors. Therein lies the need to provide systems and methods to better utilize these resources in order to improve RAID IO performance.

SUMMARY

Accordingly, an embodiment of the present disclosure is directed to a method for distributing IO load in a RAID storage system. The RAID storage system may include a plurality of RAID volumes and a plurality of processors. The load distribution method may include determining whether the RAID storage system is operating in a write-through mode or a write-back mode; distributing the IO load to a particular processor selected among the plurality of processors when the RAID storage system is operating in the write-through mode, the particular processor being selected based on a number of available resources associated with the particular processor; and distributing the IO load among the plurality of processors when the RAID storage system is operating in the write-back mode, the distribution being determined based on: an index of a data stripe, and a number of processors in the plurality of processors.

A further embodiment of the present disclosure is directed to a method for distributing IO load in a RAID storage system operating in a write-through mode. The RAID storage system may include a plurality of RAID volumes and a plurality of processors. The load distribution method may include receiving an IO request at a primary processor; determining a number of available resources associated with each of the plurality of processors; selecting a particular processor from the plurality of processors for processing the IO request, the particular processor being selected based on the number of available resources associated with each of the plurality of processors; processing the IO request utilizing the particular processor; and sending a completion response from the particular processor to an initiator of the IO request.

An additional embodiment of the present disclosure is directed to a method for distributing IO load in a RAID storage system operating in a write-back mode. The RAID storage system may include a plurality of RAID volumes and a plurality of processors. The load distribution method may include accumulating data from host writes in a controller cache; dividing the accumulated data into a plurality of write requests, each of the plurality of write requests spanning no more than one data stripe; and distributing the plurality of write requests among the plurality of processors utilizing a predetermined algorithm, the predetermined algorithm based on: the index of the data stripe corresponding to each of the plurality of write requests, and the number of processors in the plurality of processors.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION

Reference will now be made in detail to the presently preferred embodiments of the invention, examples of which are illustrated in the accompanying drawings.

Various techniques have been utilized in efforts to improve IO performance of RAID systems. For instance, larger caches and multiple processors have been introduced to RAID controllers. In addition, hardware assisted fast path engines have been utilized in certain RAID systems. Such fast path engines may provide hardware automated IO paths that may not require any firmware assistance to start and process IO requests. While non-parity protected RAID volumes (e.g., RAID 0, RAID 1 and their derivatives) may benefit directly from hardware assistance, increasing write performance of parity protected RAID volumes (e.g., RAID 5, RAID 6 and their derivatives) is still challenging.

The present disclosure is directed to systems and methods for distributing IO load (i.e., load balancing) in a RAID storage system. The IO load may be distributed across multiple processors within the storage system in order to improve its performance. The load balancing methods of the present disclosure may improve IO performance in parity protected RAID volumes. In addition, the load balancing methods may also be appreciated in non-parity protected RAID volumes. For instance, if a non-parity protected RAID volume is not equipped with any hardware assisted fast path engine, then the load balancing methods of the present disclosure may be utilized in an effort to improve its performance.

The load balancing methods in accordance with the present disclosure may be adapted to support both write-through mode and write-back mode. Write-through mode may refer to operations of the RAID storage system where every host write causes a synchronous write to a corresponding storage volume. On the other hand, write-back mode may refer to operations of the RAID storage system where host writes are maintained in the RAID controller cache and are not immediately written to the storage volume. Instead, the data that is being written may be accumulated in the controller cache and written to their corresponding storage volumes at a later time.

Figure 1:
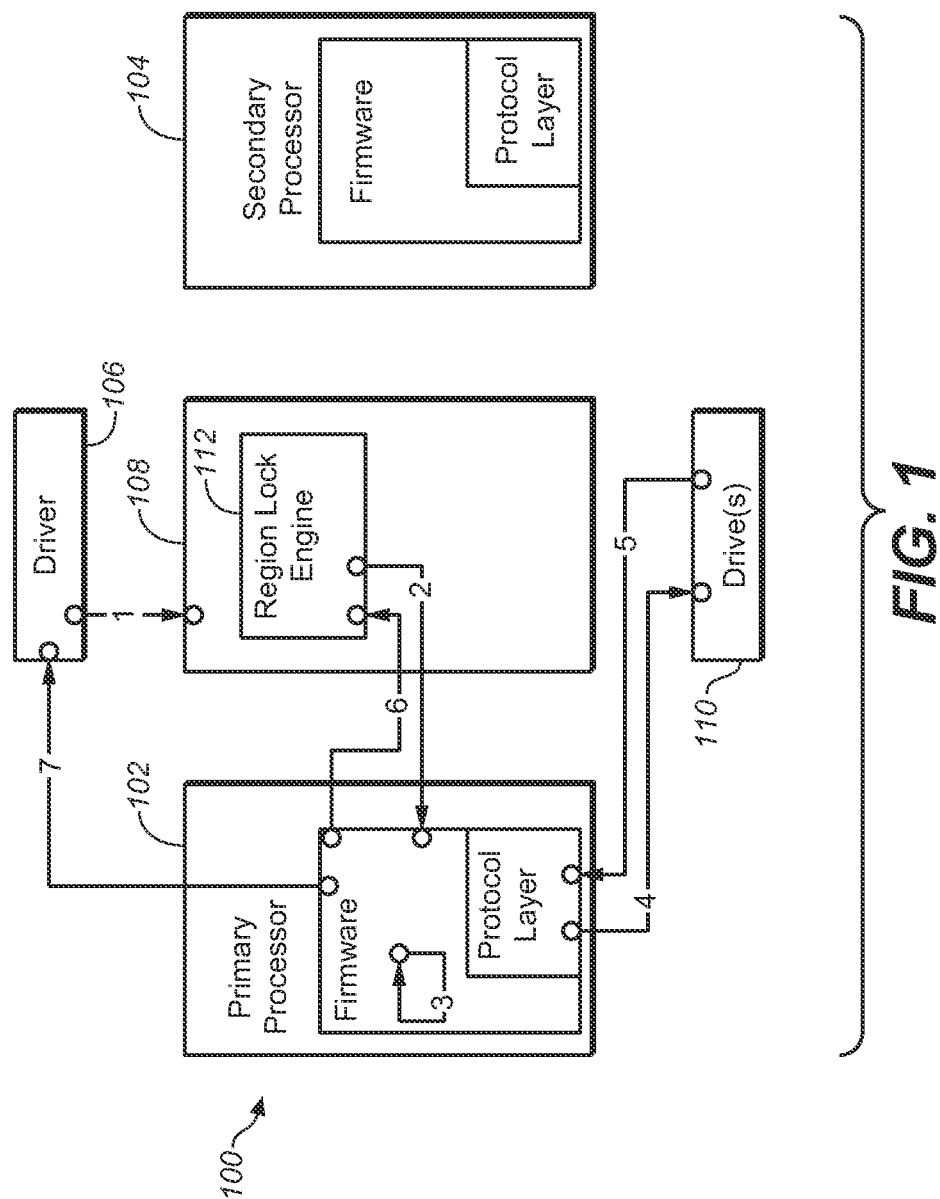
FIG. 1 is a block diagram illustrating a RAID storage system operating in write-through mode.

Referring to FIG. 1, a block diagram illustrating a RAID storage system 100 operating in write-through mode is shown. The RAID system 100 may include multiple processors for processing IO requests from one or more hosts/drivers. Among the multiple processors of the RAID system 100, one processor may be designated as the primary processor and the other processors may be considered as the secondary processors. While only two processors 102 and 104 are illustrated in FIG. 1, it is understood that additional processors may be included without departing from the spirit and scope of the present disclosure.

In the write-through mode, when a host driver 106 sends/initiates a write request to the RAID system 100, the data that is being written needs to be committed to the corresponding storage volume before completing the write to the host. For instance, suppose a write request from the driver 106 is posted to the controller interface 108 of the RAID system 100 (step 1 in FIG. 1). The controller interface 108 is a component of the RAID system 100 that may receive IO requests from various hosts and interface with various processors of the RAID system 100. In one embodiment, upon receiving the write request, the controller interface 108 may utilize the region lock engine 112 to attempt to acquire a region lock and post the region lock grant to the grant queue allocated by firmware (step 2 in FIG. 1). The region lock engine 112 may be configured as a part of the controller interface 108 or may exist as a separate component that is communicatively connected with the controller interface 108. In this manner, for each IO request initiated from the host driver 106, the request needs to go through the controller interface 108 as well as the region lock engine 112 before being processed by a processor. Furthermore, in order to avoid potential synchronization issues and have better control on load balancing across multiple processors, region lock grants are always processed by the primary processor 102.

Upon receiving the region lock grant at the primary processor 102, the primary processor 102 may perform minimal amount of heuristics to determine which processor (among the multiple available processors in the RAID system 100) may be the ideal candidate to process the IO request (step 3 in FIG. 1). In one embodiment, the ideal candidate to process the IO request is the processor that has the maximum number of available/free resources at the time the new IO request gets a grant. The number of available resources associated with each processor may take into consideration various factors, including processor load, available local memory space or the like. Whichever processor has the maximum number of free resources to process the IO request may be utilized to process the received IO request.

For illustrative purposes, suppose that the primary processor 102 is deemed to be the processor that has the maximum number of free resources to process the IO request. The primary processor 102 may convert the IO request (i.e., the logical RAID IO) into physical IO(s) and send each physical IO to the respective physical drives 110 through its protocol layer (step 4 in FIG. 1). The drive(s) 110 in turn will complete the physical IO(s) and respond back to the protocol layer of the primary processor 102 (step 5 in FIG. 1). The primary processor 102 may release the region lock upon completion of all physical IOs (step 6 in FIG. 1) and then complete the IO request back to the initiator of the request, or the driver 106 in this example as shown in step 7 in FIG. 1.

Figure 2:
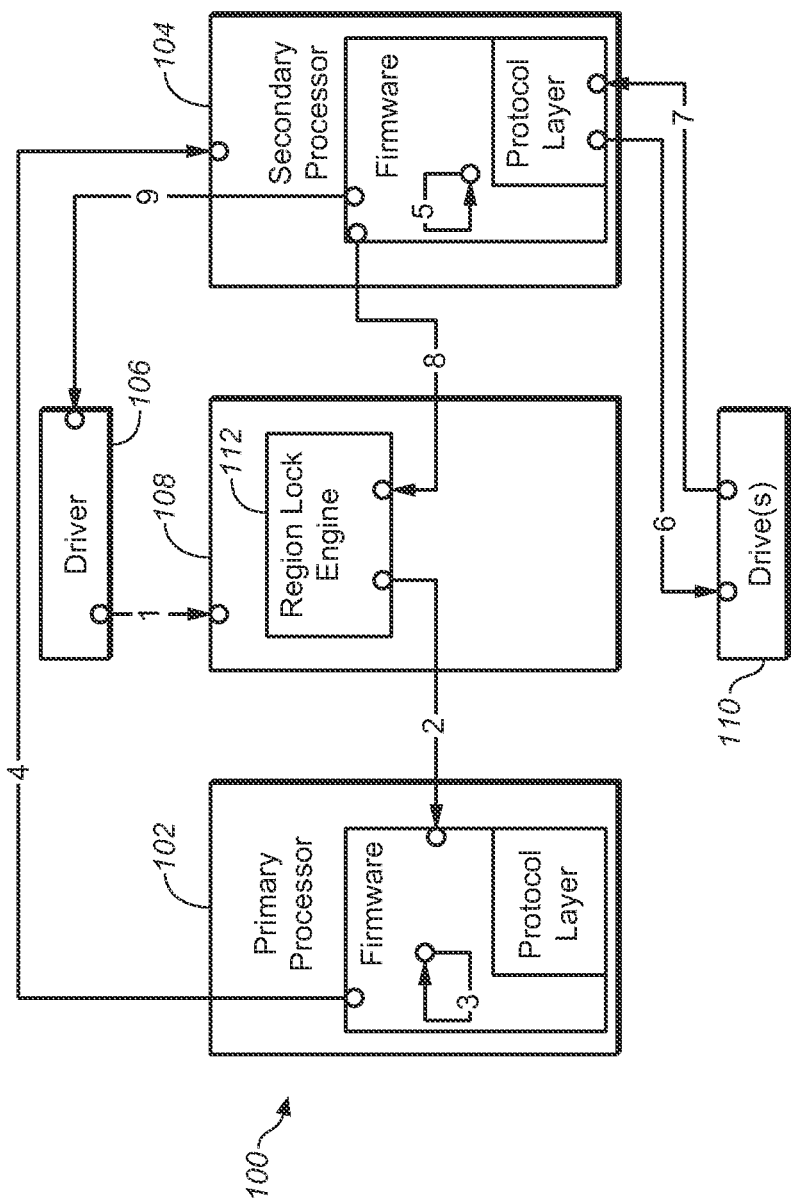
FIG. 2 is a block diagram illustrating the RAID storage system of FIG. 1, wherein a different processor is utilized for processing an IO request.

In another example, as illustrated in FIG. 2, suppose that the primary processor 102 determines that the secondary processor 104 has the maximum number of free resources to process the IO request. The primary processor 102 may then send the IO request to the secondary processor 104 through an inter processor messaging unit as shown in step 4 in FIG. 2. The inter processor messaging unit may be implemented utilizing various wired or wireless communication means. The secondary processor may then convert the logical RAID IO into physical IO(s) (step 5 in FIG. 2) and send each physical IO to the respective physical drives 110 through its protocol layer (step 6 in FIG. 2). The drives 110 will in turn complete the physical IO(s) and respond back to the protocol layer of the secondary processor 104 (step 7 in FIG. 2).

Subsequently, the secondary processor 104 may release the region lock upon completion of all physical IOs (step 8 in FIG. 2) and then complete the IO request back to the initiator of the request, or the driver 106 in this example as shown in step 9 in FIG. 2. In this manner, the primary processor 102 may delegate work to other processors, but the host drivers may not need to be aware when, or if, such delegations took place.

Figure 3:
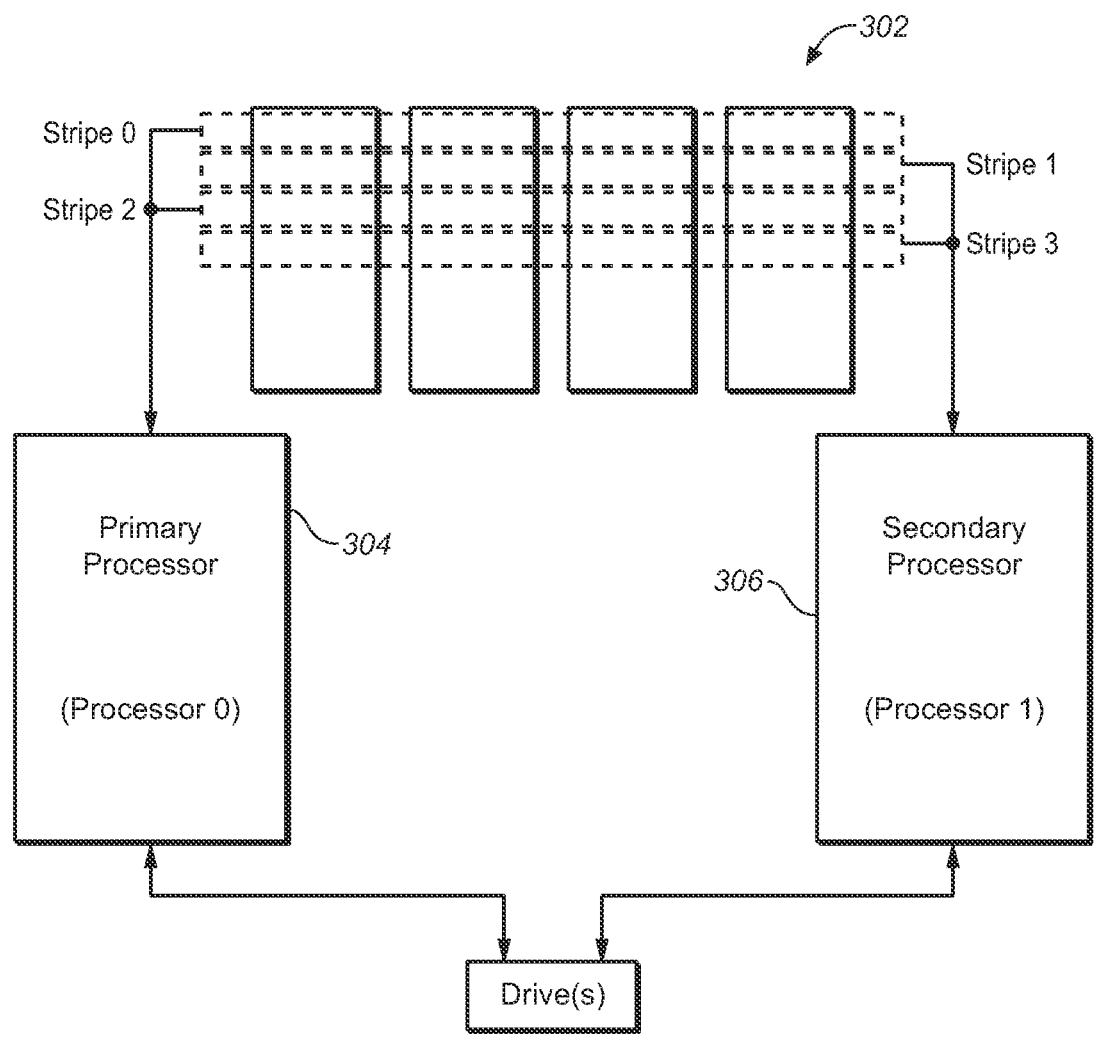
FIG. 3 is a block diagram illustrating a RAID storage system operating in write-back mode.

It is contemplated that a RAID system may also operate in write-back mode. When operating in the write-back mode, as illustrated in FIG. 3, data that is being written may be accumulated in the RAID controller cache 302 but not immediately written to the corresponding disks. The accumulated data may be written to the corresponding disks at a later time on a stripe basis. To facilitate load balancing when writing the accumulated data to the disks, each available processor in the RAID system may be assigned to process certain stripes. However, one requirement is that a given stripe should always be processed on the same processor. That is, if the first write to stripe "x" is processed on "Processor 0" and the first write to stripe "y" is processed on "Processor 1", any subsequent writes to stripe "x" should be processed on "Processor 0" and any subsequent writes to stripe "y" should be processed on "Processor 1". This is because when data in controller cache is "flushed" to the disks, the flush is performed on a stripe basis by calculating parity only once. Also, to service any reads on write back volumes, firmware needs to know which processor is holding the valid data in cache. This is also achieved by always processing any writes to a given stripe on a given processor and any reads to that stripe will also be processed on that processor itself. In order to satisfy this requirement and provide the ability to effectively load balance the received IO requests across multiple processors, an index-based load balancing algorithm is proposed.

In one embodiment, as illustrated in FIG. 3, the stripes and the processors are indexed. The processor assigned to process a write request is determined based on the index of the stripe and the number of available processors. More specifically, the processor assigned to process data changes in a particular stripe may be determined based on modulo of the index of the particular stripe by the number of processors in the RAID system, or:

Processor Index=Stripe Index % Number of Processors

This assignment algorithm provides effective load balancing across multiple processors and ensures that all writes to a given stripe are always processed on the same processor. For example, as shown in FIG. 3, any data written to "Stripe 0"

will be assigned to "Processor 0" 304 and any data written to "Stripe 1" in will be assigned to "Processor 1" 306. Furthermore, in this two-processor RAID system, any write to any even stripe number will be processed on "Processor 0" 304 and any write to any odd stripe number will be processed on "Processor 1" 306.

Figure 4:
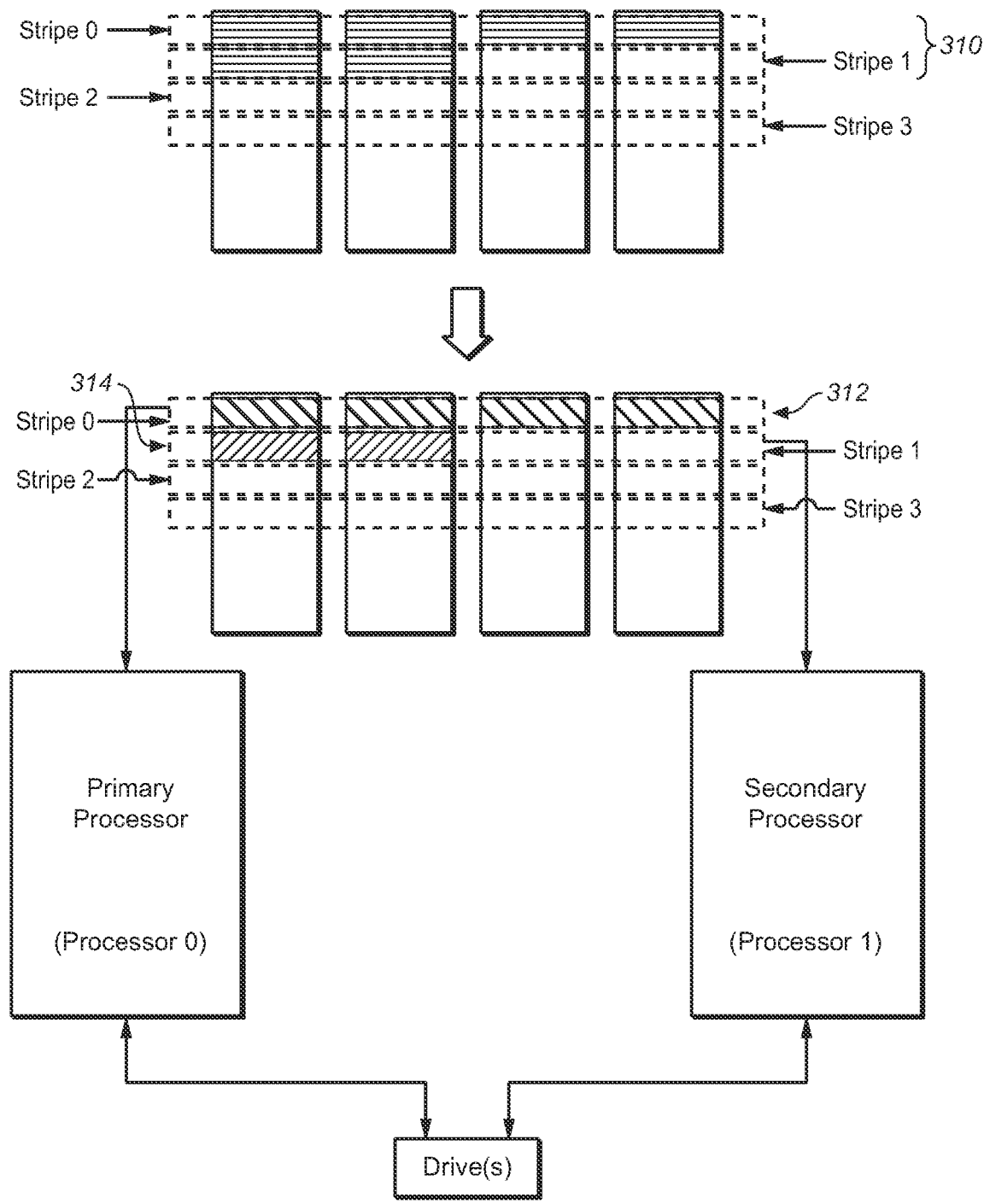
FIG. 4 is a block diagram illustrating the RAID storage system of FIG. 3, wherein a write request spanning more than one stripe is divided into multiple write requests each spanning no more than one stripe.

In addition, in accordance with the present disclosure, any single write request initiated by a host driver that spans multiple stripes will be divided into multiple write requests each spanning no more than one stripe. FIG. 4 depicts dividing a write request 310 that spans "Stripe 0" and a part of "Stripe 1" into two write requests 312 and 314, where requests 312 and 314 each spanning no more than one stripe. In this manner, load balancing and processor consistency (i.e., a given stripe is always processed on the same processor) may be provided on a stripe-basis uniformly in all situations.

It is understood that the two-processor RAID systems depicted above are merely exemplary. RAID systems with more than two processors may utilize the load balancing methods described above without departing from the spirit and scope of the present disclosure. It is also understood that while the examples above illustrated handling/processing of write requests from host drivers, the load balancing methods of the present disclosure are not limited to only write requests. For instance, if a RAID system processes read requests using firmware, the method in accordance with the present disclosure may also be efficiently applied to load balance of read requests across multiple processors as well. Furthermore, the load balancing methods of the present disclosure may be applicable to any RAID volume types, whether they are with or without parity protections.

For instance, when applied to parity protected RAID volumes, the RAID system may include one or more XOR engines configured for calculating parities for the parity protected RAID volumes. In one embodiment, each processor of the RAID system may include a dedicated direct memory access (DMA) and XOR engine. In this manner, each processor may calculate the parity information independently without requiring any synchronization. Alternatively, one or more processors may have shared access to such engines, and the available engines may be synchronized for use by multiple processors. It is understood that whether to provide a dedicated DMA and XOR engine for each processor in the RAID system may be a design decision. Various factors, such as cost, size, power consumption or the like may be a part of the design consideration. It is also understood that the actual calculation of the parity information may be similar to the conventional methods.

Figure 5:
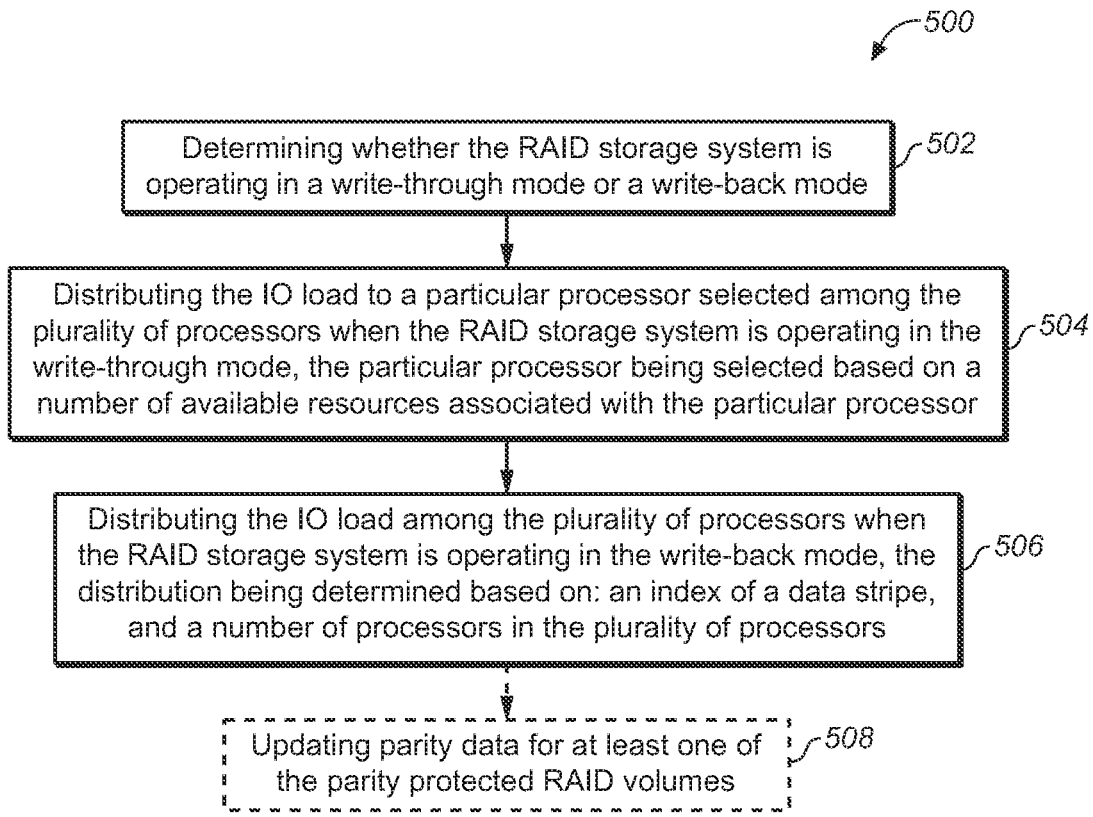
FIG. 5 is a flow chart illustrating a load balancing method in accordance with the present disclosure.

FIG. 5 shows a flow diagram illustrating steps performed by a load balancing method 500 in accordance with the present disclosure. The load balancing method 500 may be executed by a RAID controller, which may be implemented as firmware or software components that are configured for controlling the operations of a RAID system. The RAID system may include multiple RAID volumes and multiple processors as previously described.

A RAID system may operate in a write-through mode or a write-back mode. Furthermore, certain RAID systems may provide the users abilities to select the operation mode (e.g., write-through or write-back). Therefore, step 502 may first determine whether the RAID storage system is operating in the write-through mode or the write-back mode. If the RAID storage system is operating in the write-through mode, step 504 may distribute the IO load to a particular processor selected among the plurality of processors based on the number of available resources associated the processors. In one embodiment, as described above, step 504 may determine the number of available resources associated with each processor and select the processor with the maximum number of available resources to process IO request. Once the IO request is processed by the selected processor, the selected processor may then send a completion response back to the host that initiated the IO request.

On the other hand, if the RAID storage system is operating in the write-back mode, step 506 may distribute the IO load among the multiple processors based on an index-based load balancing algorithm. In one embodiment, as described above, the accumulated data in the RAID controller cache is divided into multiple write requests, where each write request may span no more than one data stripe. These write requests may then be distributed among the processors based on the index-based load balancing algorithm described above. In this manner, load balancing across multiple processors may be provided while ensuring that all writes to a given stripe are always processed on the same processor.

Furthermore, if the RAID volumes are parity protected, then upon completion of steps 504 or 506 (based on the operation mode of the RAID system), step 508 may update the parity data for at least one of the parity protected RAID volumes utilizing one or more XOR engines as previously described.

It is to be understood that the present disclosure may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for distributing input/output (IO) load in a Redundant Array of Independent Disks (RAID) storage system, the RAID storage system including a plurality of RAID volumes and a plurality of processors, the method comprising:
determining whether the RAID storage system is operating in a write-through mode or a write-back mode;
distributing the IO load to a particular processor selected among the plurality of processors when the RAID storage system is operating in the write-through mode, the particular processor being selected based on a number of available resources associated with the particular processor; and distributing the IO load among the plurality of processors when the RAID storage system is operating in the write-back mode, the distribution being determined based on: an index of a data stripe, and a number of processors in the plurality of processors.

2. The method of claim 1, wherein the particular processor being selected when the RAID storage system is operating in the write-through mode is a processor with a maximum number of available resources.

3. The method of claim 1, wherein the plurality of processors includes a primary processor and at least one secondary processor.

4. The method of claim 3, wherein distributing the IO load to a particular processor selected among the plurality of processors when the RAID storage system is operating in the write-through mode further comprises:
receiving a write request from a host;
determining the number of available resources associated with each of the plurality of processors;
selecting the processor with the maximum number of available resources as the particular processor for processing the write request;
processing the write request utilizing the particular processor; and
sending a completion response from the particular processor to the host.

5. The method of claim 4, further comprising:
obtaining a region lock upon receiving the write request; and
releasing the region lock upon completion of processing the write request, the region lock being released by the particular processor selected for processing the write request.

6. The method of claim 1, wherein distributing the IO load among the plurality of processors when the RAID storage system is operating in the write-back mode further comprises:
accumulating data from host writes in a controller cache;
dividing the accumulated data into a plurality of write requests, each of the plurality of write requests spanning no more than one data stripe;
distributing the plurality of write requests among the plurality of processors utilizing a predetermined algorithm, the predetermined algorithm based on: the index of the data stripe corresponding to each of the plurality of write requests, and the number of processors in the plurality of processors.

7. The method of claim 6, wherein the predetermined algorithm is configured for distributing the plurality of write requests based on: a modulo of the index of the data stripe corresponding to each of the plurality of write requests by the number of processors in the plurality of processors.

8. The method of claim 1, wherein at least one of the plurality of RAID volumes is a parity protected RAID volume, and the method further comprising:
updating parity data for the at least one parity protected RAID volume.

9. A Redundant Array of Independent Disks (RAID) storage system, comprising:
a plurality of RAID volumes;
a plurality of processors; and
a RAID controller configured to distribute input/output (IO) load in the RAID storage system, wherein the RAID controller is configured to:
determine whether the RAID storage system is operating in a write-through mode or a write-back mode;
distribute the IO load to a particular processor selected among the plurality of processors when the RAID storage system is operating in the write-through mode, wherein the particular processor is selected based on a number of available resources associated with the particular processor; and
distribute the IO load among the plurality of processors when the RAID storage system is operating in the write-back mode, wherein the distribution is determined based on: an index of a data stripe, and a number of processors in the plurality of processors.

10. The storage system of claim 9, wherein the particular processor being selected when the RAID storage system is operating in the write-through mode is a processor with a maximum number of available resources.

11. The storage system of claim 9, wherein the plurality of processors includes a primary processor and at least one secondary processor.

12. The storage system of claim 11, wherein when the RAID storage system is operating in the write-through mode, the RAID controller is further configured to:
receive a write request from a host;
determine the number of available resources associated with each of the plurality of processors; and
select the processor with the maximum number of available resources as the particular processor for processing the write request.

13. The storage system of claim 9, wherein when the RAID storage system is operating in the write-back mode, the RAID controller is further configured to:
accumulate data from host writes in a controller cache;
divide the accumulated data into a plurality of write requests, each of the plurality of write requests spanning no more than one data stripe;
distribute the plurality of write requests among the plurality of processors utilizing a predetermined algorithm, the predetermined algorithm based on: the index of the data stripe corresponding to each of the plurality of write requests, and the number of processors in the plurality of processors.

14. The storage system of claim 13, wherein the predetermined algorithm is configured for distributing the plurality of write requests based on: a modulo of the index of the data stripe corresponding to each of the plurality of write requests by the number of processors in the plurality of processors.

* * * * *